United States Patent
Meunier (10) Patent No.: US 10,817,806 B2
(45) Date of Patent: Oct. 27, 2020

(54) PREDICTIVE MODEL FOR SUPPORTING CARPOOLING

(71) Applicant: Conduent Business Services, LLC, Dallas, TX (US)

(72) Inventor: Jean-Luc Meunier, Saint-Nazaire-les-Eymes (FR)

(73) Assignee: Xerox Corporation, Norwalk, CT (US)

( * ) Notice: Subject to any disclaimer, the term of this patent is extended or adjusted under 35 U.S.C. 154(b) by 918 days.

(21) Appl. No.: 15/223,956

(22) Filed: Jul. 29, 2016

(65) Prior Publication Data

US 2018/0032919 A1  Feb. 1, 2018

(51) Int. Cl.
*G06Q 10/00* (2012.01)
*G06Q 10/02* (2012.01)
(Continued)

(52) U.S. Cl.
CPC ............. *G06Q 10/02* (2013.01); *G06F 16/29* (2019.01); *G06N 5/022* (2013.01); *G06Q 10/06* (2013.01); *G06Q 50/30* (2013.01)

(58) Field of Classification Search
CPC ...................................................... G06Q 10/00
See application file for complete search history.

(56) References Cited

U.S. PATENT DOCUMENTS

| | | | | |
|---|---|---|---|---|
| 8,799,038 B2 * | 8/2014 | Chen | ............. | G06Q 10/06 705/5 |
| 2004/0267449 A1 * | 12/2004 | Adamczyk | ......... | G01C 21/3438 701/410 |

(Continued)

FOREIGN PATENT DOCUMENTS

DE   20 2005 016 720 U1   10/2006

OTHER PUBLICATIONS

U.S. Appl. No. 15/000,299, filed Jan. 19, 2016, Feuillette, et al.
(Continued)

*Primary Examiner* — Tonya Joseph
(74) *Attorney, Agent, or Firm* — Fay Sharpe LLP (57) ABSTRACT

A system for generating a carpooling prediction includes a computer that performs the operations of receiving a query for a ride match location from a user computing device. The query includes a given destination location and target arrival time for reaching the destination. The computer is operative to transmit coordinates to the user computing device of a location where a user can find other users willing to rideshare. For a number of passengers that are looking for a ride to a given destination during a given time, the computer is operative to predict a number of drivers that will pass or end at the given destination during a given time interval that includes the target time. For a number of drivers that are looking to offer a ride to a given destination during a given time, the computer is further operative to predict a number of passengers that will pass or wait at a given node, for example, along the drivers' route or alternate route, for reaching the destination. Based on the prediction, the computer is further operative to transmit coordinates to the user computing device corresponding to a location where the at least one driver or passenger is predicted to pass or be located. The computer is further operative to process a transaction between two users in response to receiving a communication from a remote user device authenticating the transaction between the two users.

14 Claims, 8 Drawing Sheets

(51) Int. Cl.
*G06F 16/29* (2019.01)
*G06Q 50/30* (2012.01)
*G06Q 10/06* (2012.01)
*G06N 5/02* (2006.01)

(56) References Cited

U.S. PATENT DOCUMENTS

| | | | | |
|---|---|---|---|---|
| 2005/0049781 | A1* | 3/2005 | Oesterling | G06Q 10/02 701/468 |
| 2008/0094278 | A1* | 4/2008 | Castaneda | G01S 5/0252 342/357.64 |
| 2008/0114543 | A1* | 5/2008 | Vishnu | G01C 21/20 701/533 |
| 2008/0189148 | A1* | 8/2008 | Diaz | G06Q 10/02 705/6 |
| 2008/0231462 | A1* | 9/2008 | Hobart | G08B 21/22 340/686.6 |
| 2009/0234658 | A1 | 9/2009 | Greenwell et al. | |
| 2010/0088026 | A1* | 4/2010 | Manolescu | G08G 1/20 701/469 |
| 2010/0207812 | A1 | 8/2010 | Demirdjian et al. | |
| 2012/0192261 | A1* | 7/2012 | Blot-Levevre | G06Q 20/322 726/10 |
| 2012/0221470 | A1* | 8/2012 | Lyon | G06Q 20/04 705/44 |
| 2012/0253654 | A1 | 10/2012 | Sun et al. | |
| 2013/0054281 | A1* | 2/2013 | Thakkar | G06Q 50/30 705/5 |
| 2013/0261960 | A1 | 10/2013 | Wu et al. | |
| 2013/0317742 | A1 | 11/2013 | Ulloa Paredes et al. | |
| 2013/0317884 | A1 | 11/2013 | Ulloa Paredes et al. | |
| 2014/0129578 | A1 | 5/2014 | Lehmann et al. | |
| 2014/0173511 | A1 | 6/2014 | Lehmann et al. | |
| 2014/0201066 | A1 | 7/2014 | Roux et al. | |
| 2015/0088756 | A1* | 3/2015 | Makhotin | G06Q 20/3829 705/71 |
| 2015/0161554 | A1* | 6/2015 | Sweeney | G06Q 10/063114 705/7.15 |
| 2015/0199633 | A1 | 7/2015 | Convertino et al. | |
| 2015/0206267 | A1* | 7/2015 | Khanna | G06Q 50/30 705/5 |
| 2015/0254581 | A1* | 9/2015 | Brahme | G06Q 10/02 705/5 |
| 2015/0317568 | A1 | 11/2015 | Grasso | |
| 2015/0324717 | A1 | 11/2015 | Lord et al. | |
| 2016/0117610 | A1* | 4/2016 | Ikeda | G06Q 10/02 705/5 |
| 2016/0123748 | A1 | 5/2016 | Chidlovskii et al. | |
| 2016/0307287 | A1 | 10/2016 | Jat | |
| 2016/0364645 | A1 | 12/2016 | Ulloa Paredes | |
| 2017/0109764 | A1 | 4/2017 | Tripathi et al. | |
| 2017/0167882 | A1 | 6/2017 | Ulloa Paredes et al. | |
| 2017/0221168 | A1* | 8/2017 | Baughman | G06Q 30/0205 |
| 2017/0270447 | A1* | 9/2017 | Borean | H04W 4/023 |

OTHER PUBLICATIONS

U.S. Appl. No. 15/000,560, filed Jan. 19, 2016, Chidlovskii, et al.
Wirges, et al., "Planning the charging infrastructure for electric vehicles in cities and regions," Scientific Publishing, Chapter 8.3, pp. 303-347 (2016).
Ride Now, downloaded on Jun. 26, 2017 from http://www.ridenow.org/, pp. 1.
Oliphant, et al., "MIT Dynamic RideSharing," downloaded on Jun. 26, 2017 from: http://ridesharechoices.scripts.mit.edu/home/wpcontent/papers/APA_TPD_Webinar_Aug2010.pdf, pp. 1-64 (Aug. 2010).
EU Project SocialCar, downloaded on Jun. 26, 2017 from http://cordis.europa.eu/project/rcn/193402_en.html, pp. 1-5 (2017).
EU Project OPTI-TRANS, downloaded on Jun. 26, 2017, from www.optitrans-fp7.eu, pp. 1-3 (2011).
Moovel Group, et al., "An urban mobility company making cities smaller," downloaded on Jun. 26, 2017 from http://www.ridescoutapp.com/, pp. 1-6 (2016).
NweRIDE, downloaded on Jun. 26, 2017 from http://www.nweride.eu/, pp. 1-3 (2017).
Bridj—Wikipedia, downloaded on Jul. 5, 2017 from https://en.wikipedia.org/wiki/Bridj, pp. 1-2 (2017).
Chariot—Wikipedia, downloaded on Jul. 5, 2017 from https://en.wikipedia.org/wiki/Chariot_(company), pp. 1-2 (2017).
Moovit—Wikipedia, downloaded on Jul. 5, 2017 from https://en.wikipedia.org/wiki/Moovit, pp. 1-5 (2017).

\* cited by examiner

PREDICTIVE MODEL FOR SUPPORTING CARPOOLING

BACKGROUND

The present disclosure relates to a predictive model for supporting carpooling and ridesharing services, which estimates collective ride offers and demands between users at different locations based on a dataset of trajectories. The present disclosure is anticipated for use in a ridesharing service that matches rides, but is amenable to other transportation and non-transportation services as well.

Ridesharing is a carpooling service that arranges on-demand, one-time shared rides. A transportation network company matches rides within a short-distance using smartphones. One network that launched a ridesharing service operates a mobile application that connects drivers with passengers based on GPS. When a passenger submits a trip request via its smartphone, a driver automatically receives the passenger's location as GPS coordinates at its smartphone. The driver has the option to reject a ride. If the driver accepts the ride, the network company handles the payment. In this model, the network company matches rides within a city. While mostly effective, this service still suffers shortcomings. Particularly, it requires an agreement be made by the parties before the ride is arranged.

A different ridesharing organization, which has a long-distance platform, connects drivers and passengers for car trips between cities. The transportation costs are shared by everyone. However, this strategy does not work for commuting because it relies on prearranged appointments and agreements. Such an agreement is a hassle for short and frequent rides.

One type of ridesharing that does not require agreements made in advance is hitchhiking. Hitchhiking is a form of ridesharing that existed long before mobile applications were introduced by network companies to provide carpooling services. One problem that a hitchhiker faces is the risk of failing to find a ride.

In order to reduce the negative aspects of committing beforehand, there is desired a predictive model, which can estimate a probability that a first user—who is in search of a passenger or ride—will encounter or intersect with a second user—who is in search of a ride or passenger—at a certain location. The present disclosure proposes a ridesharing system and method that eliminates the requirement for parties to enter agreements beforehand by predicting the demand and the offer of ride match locations in a novel way.

INCORPORATION BY REFERENCE

The disclosure in U.S. Patent Application 2014/0201066, filed Jan. 14, 2013, titled "SYSTEM AND METHOD FOR ENABLING TRANSACTIONS ON AN ASSOCIATED NETWORK," to Pascal Roux, et al., the contents of which are fully incorporated herein.

BRIEF DESCRIPTION

In one embodiment, the disclosure is related to a system for generating a carpooling prediction. The system includes a computer programmed to perform a predictive model including the operations of receiving a query for a ride match location from a user computing device. The query includes a given destination location and target arrival time for reaching the destination. The computer is further operative to predict a number of drivers that will pass or end at the given destination during a given time interval that includes the target time. Based on the prediction, the computer is further operative to transmit coordinates to the user computing device of a location where a user can find other users willing to rideshare. The location corresponds to a given node where at least one driver is predicted to be available at or offering rides to the given destination. The computer is further operative to process a transaction between two users in response to receiving a communication from a remote user device authenticating the transaction between the two users.

In one embodiment, the disclosure is related a system for generating a carpooling prediction. The system includes a computer programmed to perform a predictive model including the operations of receiving a query for a ride match location from a user computing device. The query includes a given destination location and target arrival time for reaching the destination. The computer is operative to predict a number of passengers that will pass or wait at a given node for reaching the destination during a given time interval that includes the target time. Based on the prediction, the computer is operative to transmit coordinates to the user computing device of a location where a user can find other users willing to rideshare, wherein the given node corresponds to a location where at least one passenger is predicted to be located. The computer is further operative to process a transaction between two users in response to receiving a communication from a remote user device authenticating the transaction between the two users.

In another embodiment, the disclosure is related to a system for generating a rideshare location between a driver and a passenger. The system includes a computer programmed to perform a predictive model including the operation of predicting a number of drivers that will pass or end at a given destination during a given time interval that includes a target arrival time for reaching the destination. The computer is further operative to predict a number of passengers that will pass or wait at a given node for reaching the given destination during a given time interval that includes the target time. Based on the predictions, the computer is operative to transmit coordinates to an associated passenger computing device of a location of the given node where at least one driver is predicted to be available at or offering rides to the given destination. The transmitting is performed in response to the system receiving a passenger query for a ride match to the given destination at the target arrival time. The computer is further operative to transmit coordinates to an associated driver computing device of the given node where at least one passenger is predicted to be searching for a ride to the given destination by the target arrival time. The transmitting is performed in response to the system receiving a driver query for a ride match to the given destination at the target arrival time.

DETAILED DESCRIPTION

The present disclosure relates to a predictive model for supporting carpooling and ridesharing services which estimates the offer or demand of users at different locations that can satisfy a customer query using a dataset of trajectories.

As used herein, a "user" is a party that would participate in a carpooling or ridesharing program and can include a driver of a vehicle or a passenger of a vehicle. A user can be a registered customer of the system providing services such as location information and additional transportation means. For distinguishing the parties herein, the driver that is offering a ride service is further referred to as the "driver" and the passenger that is seeking a ride is further referred to as the "passenger". Each user is associated with its own user-device. A user can include a person or a group of persons and can be referred herein as "it" for simplicity.

As used herein, a "ride match" refers to a user, location, and time, where a user is informed that at a given location and time, the user (passenger or driver) is likely to find other users (drivers or passengers) compliant with the time at the given location. In other words, both users desire to pass by, or reach, a certain destination at, or slightly before, a certain time at the destination.

A "tag" or "badge" includes a low-cost Near Field Communication (NFC) small device, powered or unpowered, which is capable of communication with an NFC-enabled user device over a short distance, e.g., up to 10 cm, which can be affixed to a vehicle delivering services.

A "mobile device" denotes a device owned by the user and able to download an application for interacting with the network delivering services to the user. Examples of such devices include, without limitation, personal data assistants, tablets, and other personal electronic devices. The user device may be NFC-enabled, as well as capable of data communication with one or more wired or wireless networks.

A "node" is a location identified as a tuple of its coordinates, such as GPS coordinates. Generally, the nodes of the transportation network are in proximity to a street where drivers can pass or stop by the node and passengers can also wait at or pass by the node. An "origin node" is a start location where a user of the system is getting ready to or starts its travel from. A destination node is final location where the user of the system is aiming to reach at a target time. A trajectory as referred to herein is a timed series of nodes.

Figure 1:
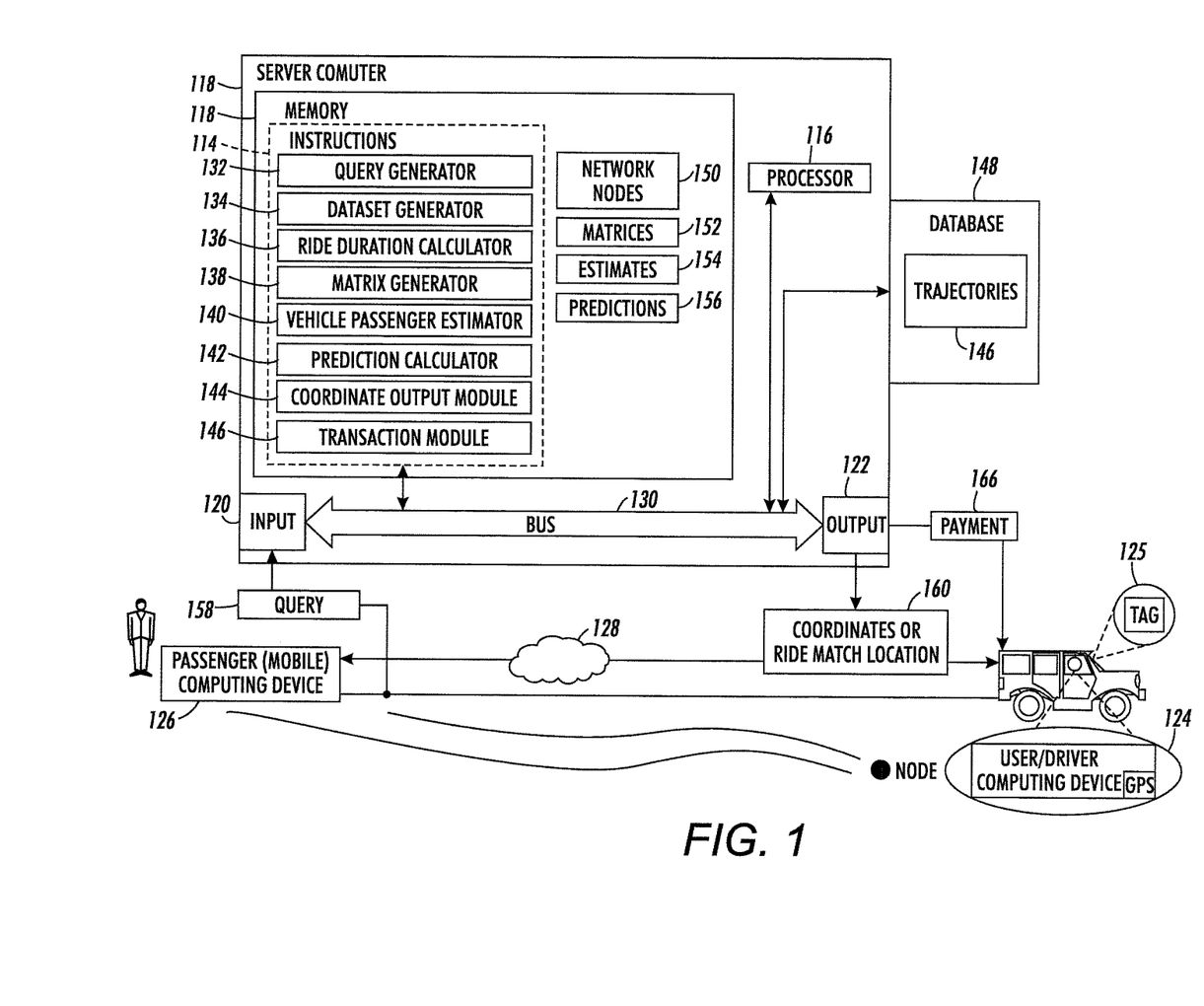
FIG. 1 is a schematic showing a computer-implemented system for predicting the demand and the offer of ridesharing.

With reference to FIG. 1, a computer-implemented system 100 for generating predictive models for supporting carpooling is shown. The schematic shows the system for predicting the demand and the offer of ridesharing. The system 100 includes memory 112 which stores instructions 114 for performing the method illustrated in FIGS. 2A-2D and a processor 116 in communication with the memory for executing the instructions. The system 100 may include one or more computing devices 118, such as the illustrated server computer. One or more input/output devices 120, 122 allow the system to communicate with external devices, such as a vehicle computing device (or driver user device) 124, and a passenger user device 126, via wired or wireless links 128, such as a LAN or WAN, such as the Internet. Hardware components 110, 112, 120, 122 of the system 100 communicate via a data/control bus 130.

The illustrated instructions 114 include a query input module 132, a dataset generator 134, a ride duration calculator 136, a matrix generator 138, a vehicle-passenger estimator 140, a prediction calculator 142, an optional coordinate-output module 144, and a transaction module 145.

The query input module 132 receives a query 158 from a remote user device from a user-driver seeking a location for picking up a potential carpooling passenger or from a user-passenger seeking a location for obtaining a potential vehicle ride. The dataset generator 134 generates a dataset of logged trajectories and identifies network nodes 150 from the dataset 146 acquired from a database 148 in communication with the system 100. The dataset 146 includes trajectories traveled in the network by anonymous registered users of the system. The ride duration calculator 136 computes an average ride duration between origin and destination nodes during a time interval; the matrix generator 138 generates a matrix 152 for each destination node and destination time interval; the vehicle-passenger estimator 140 estimates a number of drivers ("estimates 154") reaching a given node during a certain time interval or a number of passengers that will pass or wait at a given node for reaching the destination during a given time interval that includes the target time. In other words, the prediction calculator 142 computes a prediction 156 that a passenger will be searching for a ride at, or that a driver offering a ride service will simultaneously pass the passenger at, a given node during a current interval; and the coordinate-output module 144 can transmit the location coordinates 160 of a network node where passengers or drivers are predicted to be waiting or passing to a user querying the service for a ride match at a designated time. A transaction module 145 processes a transaction in response to receiving a communication indicating a consent made between two users. A payment manager module 167 can also be included in the server computer 118 for handling the transaction between two or more users, particularly by receiving payment from the passenger computing device 126 and transferring the payment 166 to the driver computing device 124. In one embodiment, the user devices 124 and 126 may include a GPS component operative to record the trajectories traveled by the user for updating the dataset. In some embodiments, the dataset of trajectories and the network nodes may have already been identified for this task and stored in the database and thus the dataset generator 132 can be omitted.

The computer system 10 may include one or more computing devices 118, 124, 126 such as a PC, such as a desktop, a laptop, palmtop computer, portable digital assistant (PDA), server computer, cellular telephone, tablet computer, pager, vehicle computer, such as a GPS, combinations thereof, or other computing device capable of executing the instructions for performing the exemplary method.

The memory 112 may represent any type of non-transitory computer readable medium such as random access memory (RAM), read only memory (ROM), magnetic disk or tape, optical disk, flash memory, or holographic memory. In one embodiment, the memory 112 comprises a combination of a random access memory and read only memory. In some embodiments, the processor 116 and memory 112 may be combined in a single chip. Memory 112 stores instructions for performing the exemplary method as well as the processed data 150-156.

The network interface 120, 122 allows the computer to communicate with other devices via a computer network, such as a local area network (LAN) or wide area network (WAN), or the internet, and may comprise a modulator/demodulator (MODEM), a router, a cable, and/or Ethernet port.

The digital processor device 118 can be variously embodied, such as by a single-core processor, a dual-core processor (or more generally by a multiple-core processor), a digital processor and cooperating math coprocessor, a digital controller, or the like. The digital processor 118, in addition to executing instructions 114 may also control the operation of the computer 118.

The term "software," as used herein, is intended to encompass any collection or set of instructions executable by a computer or other digital system so as to configure the computer or other digital system to perform he task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

FIG. 2 illustrates an exemplary method 200 which can be performed with the system of FIG. 1. The method starts at S202. At S204, as part of a preprocessing operation, a user registers and creates an account in the central system, and then-downloads an application to a user device, such as a mobile smart phone (126 in FIG. 1). Particularly, a passenger is contemplated to use a personal computer, such as a desktop computer, mobile smart phone, tablet computer, or laptop, for example, that is capable of sending a query, receiving ride match location coordinates, and initiating a transaction. A driver is contemplated for using at least one user device (124 in FIG. 1) for sending a query and receiving ride match coordinates. However, a tag—which can be registered to the driver and associated with the driver account in the central system—can be used to initiate the transaction. During registration, payment information may be provided to the system in the form of a credit card, debit account, or billing account. The application is resident on the user devices 124, 126, such as a mobile device or smart phone. During setup of the application on the mobile device, a signed application certificate having a unique application identifier, a unique application transaction identifier, and a validity period are received on the passenger's user device 124 from the central system. Similarly, in one embodiment the driver can also be provided a badge/tag 125 having a unique identifier, an irreversible counter, a master key, and a transaction log for logging previous transactions. In one embodiment, the log may correspond to a cyclic file which holds the most recent transactions. The system generates this badge, which is provided to the user. The driver deploys this tag for using the service provided by the disclosed system, particularly by placing the tag in its vehicle according to one embodiment. However, the tag need not be connected to any network, thus allowing the positioning of the tag on the vehicle. The encryption of transmitted elements and the transaction log are kept to enforce security, reduce the risk of fraudulent activity, and respect privacy.

Figure 2A:
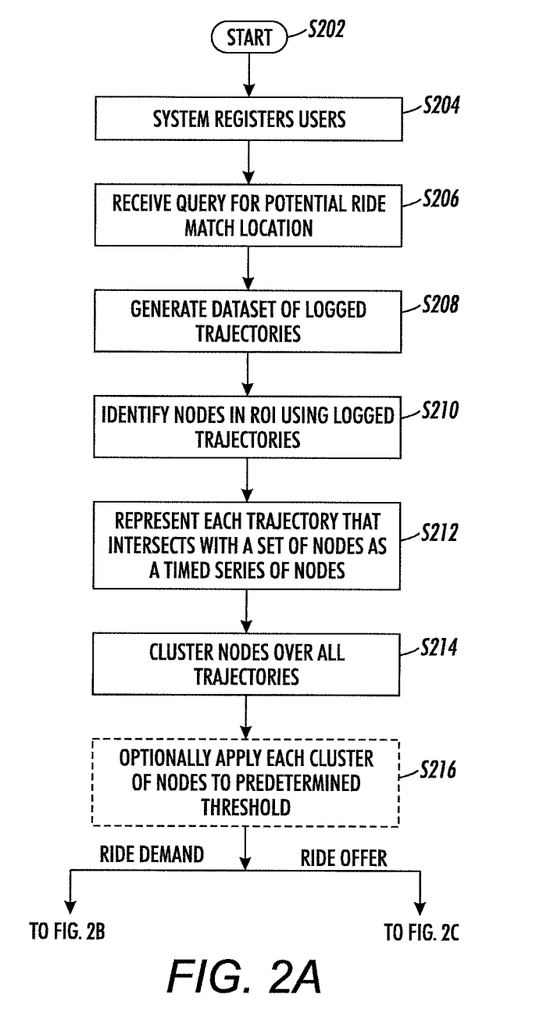
FIGS. 2A-2D illustrate an exemplary method which can be performed with the system of FIG. 1.

At some point, the registered users desire a ride or desire to offer a ride and the system receives a query for a potential ride match location where the user may find other users at S206. Particularly, in one embodiment, the user can consult a website provided by the system for receiving suggested locations where it can find other users willing to rideshare. For example, a user who desires to be a driver can access the service through its user device for suggested ride match locations where it can find users waiting for a ride service. Similarly, a user who desires a ride as a passenger (ride service) can access the system through its user device for suggested ride match locations where it can find taking trips past or to its desired destination. As part of the query, the user inputs a destination location using an interface on its user computing device 124, 126. Particularly, the destination location is required by the system to compute a ride demand or ride offer prediction. In another embodiment, the queries can also include the user's origin location, which can be used by the system to filter the results. The user is contemplated to start its journey at the origin location and desires a ride match to travel to its destination location. Also, the user inputs a target time that it desires to reach the destination as part of the query. The user computing devices 124, 126 transmit the query to the server computer for generating a prediction.

In response to the query, the system in the contemplated embodiment generates a dataset of logged trajectories at S208. Although, this dataset can be generated as part of a preprocessing step and stored in a database 148. Whereby a dataset of trajectories are stored in the database 148, the method can omit this step and instead acquire the trajectories 146 from the database. There is no limitation made herein on how to generate the trajectories. In one example approach, the system 100 can acquire the trajectories (such as route) and also node information from the existing transportation network since the network supports the rides and traffic patterns of the registered users of the network. The nodes can be defined manually based on a network manager's knowledge of the transportation network, which is being monitored and/or managed by the system. In another approach, the logged trajectories of anonymous users can be determined automatically or semi-automatically in addition to any priori knowledge, using GPS data recorded by the registered users' devices. For example, trajectories corresponding to previous rideshares, acquired through previous transactions processed by the system, can be used to generate or supplement or update the dataset. These trips are accessible particularly because the present system can keep a log of previous transactions discussed, infra, such as through GPS-logging or by using tags and badges registered in the system.

In the contemplated embodiment, the logs of trajectories traveled by anonymous users of the system include set(s) of origin, destination, stop nodes (such as, transfer nodes), or passed-by nodes along the trajectories, which are identified within a region of interest for further processing at S210. Any existing method for identifying the nodes in the region of interest can be used by the disclosed system. In the contemplated embodiment, as discussed supra, the nodes can be defined manually or automatically.

As part of this process, each node is associated with an identifier, a name, and coordinates, such as GPS coordinates. Alternatively, a list of nodes can be generated as an ordered list of stop-times (date, time, and stop identification, where a vehicle stopped to board and/or alight passengers). A similarity (score/distance) is computed between trajectories to allocate relationships. Particularly, nodes are mapped to a closest node under a constraint that the distance cannot be more than a value $\delta$. The constraint can be acquired as input provided by a manager of the system as part of a preprocessing operation or simultaneous to the generation of the dataset. The haversine formula can be used to compute the distance—yielding great-circle distances between two points on a sphere—such that the haversine $(gs_1, vs_1) \leq \delta$ distance threshold.

For illustrative purposes, if the transportation network includes n nodes, where each node is identified as a tuple of its GPS coordinates, each trajectory that intersects with a set of nodes is therefore represented as a timed series of nodes at S212. Each trajectory that does not intersect with an identified node is ignored for future processing.

The nodes over all remaining trajectories are clustered at S214. By this operation, similar points of different trajectories are grouped into one single node. In one embodiment, the clustering can be performed in a supervised manner, such as by computing a Euclidian or Manhattan distance, thus using the Euclidian distance of nodes to a centroid. There is no limitation made herein to the clustering operation performed by the dataset generator 134.

At S216, each cluster of stop nodes can be applied to a predetermined threshold to preserve anonymity and to increase the statistical significance. A predefined threshold, or a parameter, can be optionally applied to the clusters to filter and discard undesirable clusters.

Figure 2B:
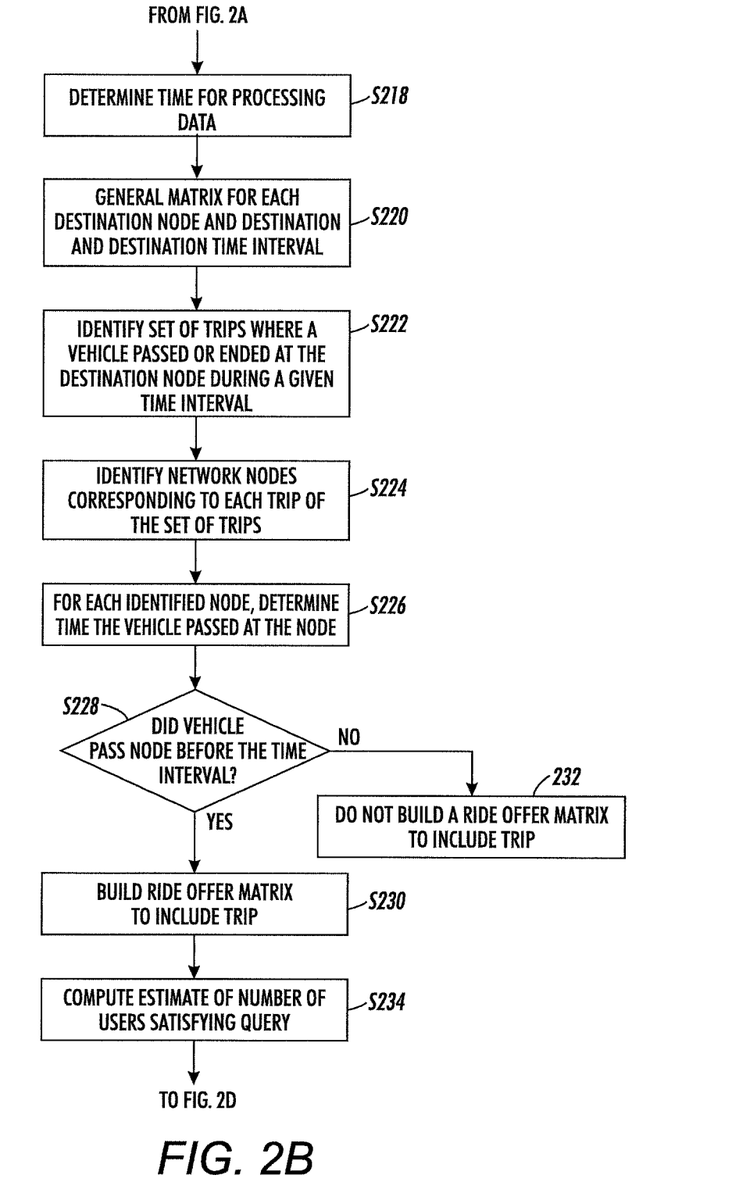

Continuing at FIG. 2B, the system assumes that the data follows a certain distribution, particularly assuming some regularity based on time. At S218, the system determines a time interval for processing the data. The time interval can be received as input entered by a manager of the system; however, there is no limitation made herein for determining the time interval. For illustrative purposes, the disclosure processes data based on the day of the week and the time of the day by the tenth hour, and this interval is reflected as $Ti=[$day of the week, number of days in week$\times$hour$\times \frac{1}{10}^{th}$ hour$]$. At S220, the matrix generator 138 generates a matrix for each destination node and destination time interval. The matrix is a time interval per node matrix. Each cell of the matrix indicates the number of drivers (i.e., vehicles) that were observed at the cell time and cell node under the constraint that the drivers were at the destination at the destination time interval.

One method to estimate a model for a given destination node D, at time interval Ti, is computed according to the algorithm:

---

For each destination D:
    For each time interval Ti:
        Set-to-zero (CounterDriver$_{D,Ti}$)
        D_Rides := {driver ride that ends at, or passes by, D during Ti}
        For each ride R of D_Rides:
            For each node N of R:
                $T_n$ := time at node N for ride R
                If $T_n < T_i$: CountDriver$_{D,Ti}(T_n,N)$ := CountDriver$_{D,Ti}(T_n,N)+1$

--- wherein CountDriver$_{D,Ti}(T_n,N)$ (ride offers matrix) is the matrix of offers, given a destination node; D is the destination node; $T_i$ is the desired time of arrival at the destination node (target time); Tn is the time at an origin node; N is an origin node for ride R. At S222, the matrix generator identifies a set of trips (i.e., trajectories) D_Rides where a registered driver passed or ended at the destination node D during a given time interval Ti. At S224, the matrix generator identifies the network nodes N corresponding to each trip R of the set of trips D_Rides. In other words, the matrix generator can identify each node that intersected with the trajectory of the previous trips in the dataset that passed or ended at the destination node. For each of the identified network nodes N, the matrix generator determines a time Tn the driver passed the network node at S226. In response to the time Tn the driver passed at the network node being less than (i.e., before) a predetermined time interval Ti (YES at S228), the system builds the ride offer matrix to include the trip at S230. In other words, the system adds "1" driver to the count for purposes of the prediction. As an illustrative example, if the system receives a query where the passenger-user desires a ride match location to find a ride to a destination node around 9:15 am on a Tuesday morning, the system counts the number of drivers that have passed that destination node on previous trips before the interval defined for the matrix generation. In response to the time Tn the previous driver passed the network node being after the predetermined time interval Ti (NO at S230), the system does not build the ride offer matrix to include the trip at S232.

In other words, the matrix generator 138 computes a count for rideshare offers at a given node of the network for a time interval Ti determined by a maximum and minimum date of observed rides for a predefined period. In one embodiment, for example, the predefined period can include a number of weeks.

At S234, the matrix generator 138 normalizes the count by the predefined period of observations to compute an estimate of the number of users satisfying the query. The "count" is associated as the number of drivers predicted to pass or end at the destination node at the desired target time. In response to the count being greater or equal to one, the system associates the network node as being a location where the at least one driver is predicted to be available at or offering rides to the given destination.

Figure 2C:
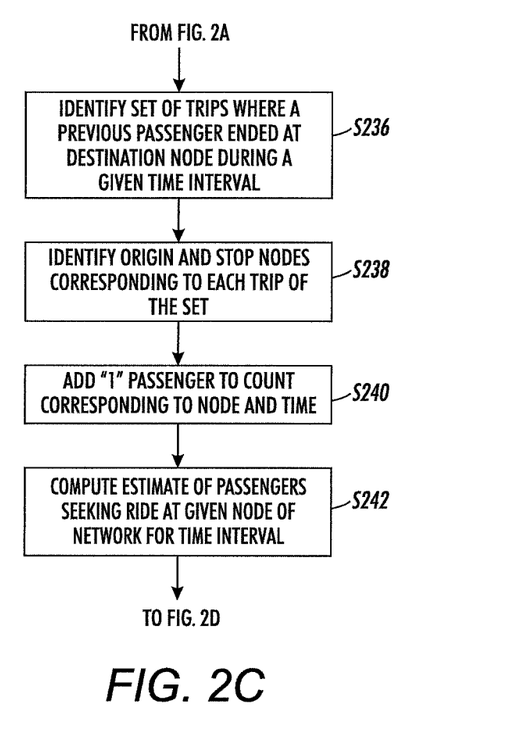

Similarly, referring to FIG. 2C, the matrix generator 138 generates a model that estimates a number of passengers that may be found waiting at a given node of the network during a given time interval and searching for a ride to a given destination node at a target time. In this embodiment, a driver is querying for a ride match location where it may find a passenger in search of a ride. As mentioned, supra, the driver provides a destination D and a target arrival time TD for arriving at or reaching the destination. First, the matrix generator 138 computes the average ride duration RD between any two nodes N, D of the network, given the arrival during time interval $T_i$ at the second (destination) node D. In other words, the matrix generator computes the average ride duration RD between a given node N (referred to below as origin node or stop node) and the destination node D (for previous rides taken) before the target arrival time during the given time interval. Based on the logged transactions or logged trajectory data, RD(N,D,$T_i$)=average ride duration from N to reach D during the time interval $T_i$.

The matrix generator predicts the number of potential passengers that would be interested in reaching the destination D at the target time, based on previous trip data. This information is used to estimate a location where the driver can or may find the potential passengers searching for a ride that the driver can provide. As part of this operation, the matrix generator 138 counts the number of passengers reaching the given destination node D during a time interval $T_i$, and then propagates this number backward on their journey using the algorithm:

For each destination D:

---

For each time interval Ti:
        Set-to-zero (CounterPassenger$_{D,Ti}$)
        P_Rides := {passenger ride that ends at D during Ti}
        For each ride R of P_Rides:

-continued

For each stop or origin node N of R:
$T_n := T_i - RD(N,D,T_i)$
$CountPassenger_{D,Ti}(T_n,N) :=$
$CountPassenger_{D,Ti}(T_n,N)+1$ wherein $CountPassenger_{D,Ti}(T_n,N)$ is the matrix at a given destination node and time at the destination node; D is the destination node; $T_i$ is the time at the destination node; Tn is the time at an origin node; N is an origin node for ride R. The matrix generator identifies a set of trips P_Rides (i.e., trajectories) where a (previous) passenger ended at the destination node D during a given time interval Ti at S236. Next, the matrix generator identifies the origin and stop nodes N corresponding to each trip R of the set of trips P_Rides AT S238. In other words, the matrix generator can identify the origin node (where each trip began) and each stop node that intersected with the trajectories of the previous trips taken by the passengers that received a ride ending at the destination node. For each of the identified origin and stop node N, the matrix generator determines a time $T_n$ of passing at the given node N at S240. In other words, the system propagates backwards from when the passenger arrived at the destination node to build the ride demand matrix. At S242, the system adds "1" passenger to the count for the cell corresponding to the (origin or stop) node and time for purposes of generating the prediction. This way, the matrix generator 138 can compute a count at S242 corresponding to probable passengers (demand) seeking a rideshare at a given node N of the network for a time interval Ti determined by a maximum and minimum date of observed passenger rides for a predefined period. In response to the count being greater or equal to one, the system can associate the origin or stop node as being a location where at least one potential passenger is predicted to be searching for a ride to the given destination.

Again, by normalizing the count by the predetermined period, such as by a number of weeks of observations, an average number of potential passengers interested in joining the user-driver for a ride to destination D during a time interval $T_i$ is estimated. The matrix generator can output the location coordinates of a node where the count indicates passengers are likely.

The driver/user receiving the output location coordinates can use this information to determine whether it will stop at the origin or stop node to pick up a potential passenger. In other words, the driver can use the given node coordinates to determine whether it will drive past the given node (should such node be along its planned route) or drive to the given node (should such node be along an alternate route) to search for a passenger in need of a ride service.

However, the embodiment disclosed herein contemplates that for a given node, in response to the count being greater or equal to one, the system can associate the origin or stop node as being a location where at least one potential passenger is predicted to be searching for a ride to a destination, that is different from the driver's given destination. In other words, the system can compute ride match locations where a driver can stop at a first node to pick up a passenger and stop at a second node (a destination of the passenger) along its route to the driver's destination.

In one embodiment, the origin or stop nodes can be filtered according to the start location of the driver. Accordingly, the system can filter out any origin or stop nodes not along a route or alternate route that the driver would take from its start location to its destination.

In summary, the matrix generator 138 generates a ride offer matrix and a ride demand matrix for each node N of the network given a certain destination and time at the destination.

In one embodiment of the disclosure, the system provides the ride match location coordinates to user devices to facilitate a rideshare between two users (a passenger and a driver) traveling to a similar destination and having approximately the same target arrival time.

Figure 2D:
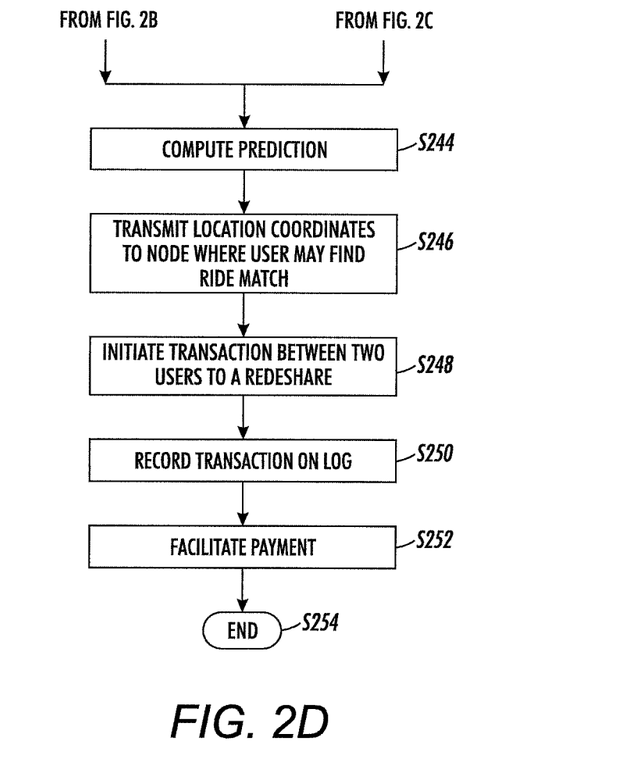

Continuing with FIG. 2D, the system computes a prediction using the matrices for traveling toward a given destination node at a target time at S244. In the case of a passenger query, the vehicle-passenger estimator 140 computes a number of drivers passing or ending at the given node during the time interval using the ride offer matrix. In the case of a driver query, using the ride demand matrix, the estimator 140 computes the number of passengers that will wait at a given node of the network during a given time interval. The computed output is associated as an estimate or prediction.

Based on the prediction 156, the coordinate-output module 144 transmits coordinates of a network node where the driver or the passenger is expected to find other users interested in a ride match at S246. These coordinates are transmitted to the user computing device that is querying for the ride match location.

The disclosure anticipates that the system does not require advance appointments. Therefore, the disclosure anticipates that a user can approach the node where it received location coordinates. In the case of a passenger, the passenger can hail a vehicle it identifies as being associated with the rideshare service, should such driver be present. For example, a hanger tag or other visible indicator can be placed in view on the vehicles desiring to offer a ride service. At S248, the transaction module 145 initiates and processes a transactions between two users to a rideshare by determining that a badge associated with a driver querying for a ride match location is placed close to an user computing device associated with a passenger also querying for a ride match location. Although, there is no limitation made herein on the type of computing device used to confirm a transaction. In other embodiments, the user devices, mobile phones, can be used.

More specifically, the passenger is granted access to the rideshare service by placing its mobile device close to the tag/badge (or similar functioning device) affixed on the vehicle or associated with the user-driver. The passenger's user device need only be placed in proximity to the tag to initiate a transaction, during which mutual authentication occurs, and a log of the transaction is recorded at S250 on the tag. The service is then delivered. The log, or a portion of the log, may be communicated back to the central system by the passenger's user device in conjunction with other transaction information corresponding to that particular user device. At S252, the passenger's account is or will subsequently be charged for the service, and the driver's account will be credited for the service. In the event that the passenger's user device is unable to communicate the transaction and log, a subsequent user device, which will receive the log from the tag, will communicate it to the central system, thereby assuring the central system receives a record of all transactions that occurred between the tag and any user device. The method ends at S254.

Figure 3A:
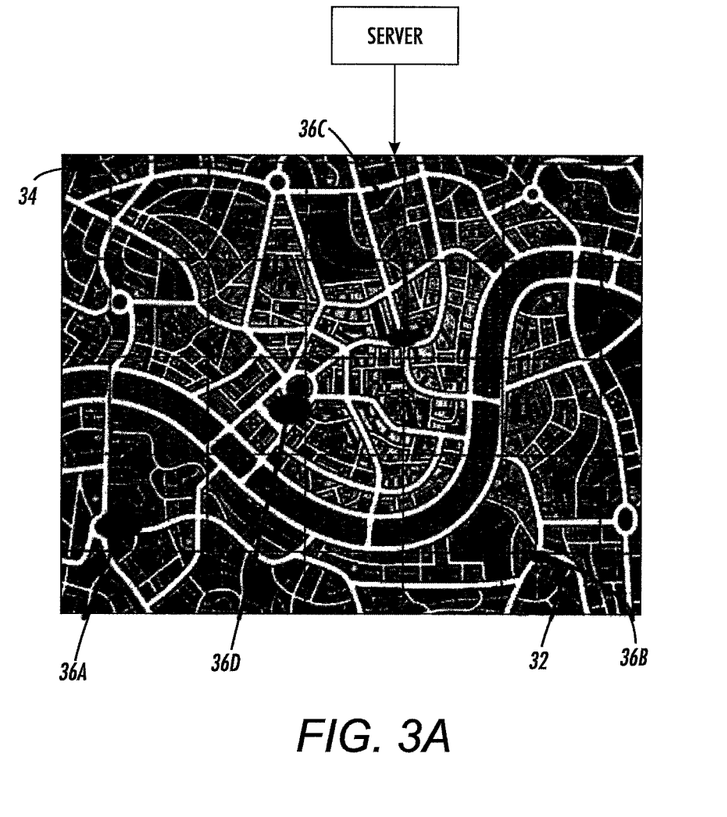
FIGS. 3A-3B are illustrative maps each showing a sample scenario where the traffic prediction method is contemplated for use.
Figure 3B:
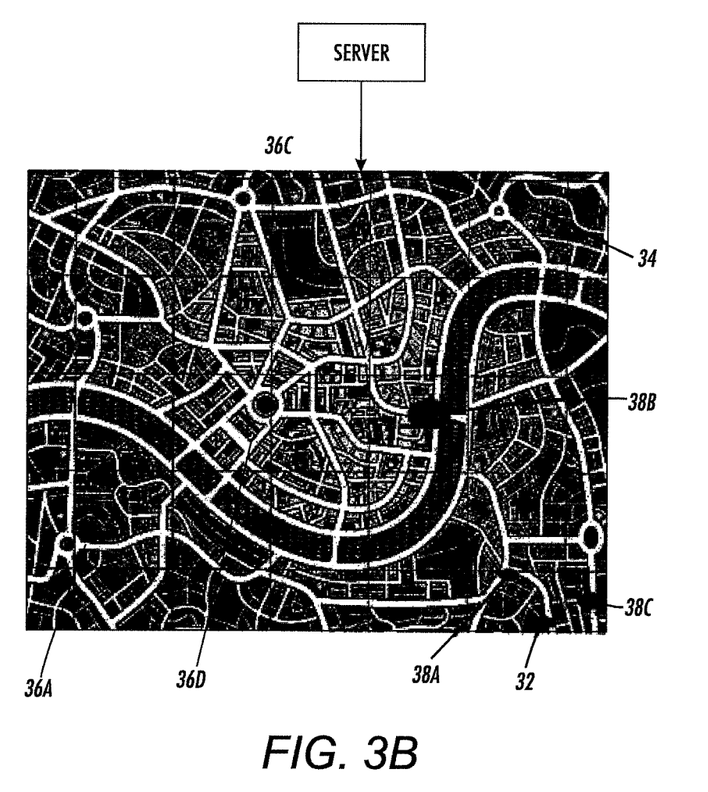

FIGS. 3A-3B are illustrative maps each showing a sample scenario where the traffic prediction method is contemplated for use. In one embodiment, the map can be provided by the system as output transmitted to the user computing device.

In another embodiment, the information included in the map can be provided to the user in a different form, such as a ranked list of coordinates. In FIG. 3A, a first user (driver) is located at origin node 32 and is getting ready to travel to, or is already en route to, destination node 34. If this driver desires to rideshare or carpool, for income or for a different purpose, the first user can query the system in search of where passengers might be waiting for a ride. Using its driver computing device, the driver can query the system for estimates regarding passenger demand and the location information where passengers are predicted to be soliciting rides, based on the trajectory data. As part of the query, the first user also provides the system with a target time for reaching the destination 34 as input. The system computes the output using the method disclosed in FIGS. 2A-2D and outputs coordinates where the first user can potentially find a ride match. The map illustrated in FIG. 3A shows four nodes (represented as shaded ovals) representing potential ride match locations 36. As illustrated in the FIGURE, the sizes of the identified ride match locations 36 are different. In one embodiment, the size can be proportional to the predicted number of passengers, where the fewest passengers are estimated for the smallest ride match location 36b and the largest passengers are estimated for largest ride match location 36a. In this manner, the first user has an option to continue on its route to the destination node 34, and it can seek a ride match at the most direct stop location 36c along its route. There are, of course, alternative routes available to the first user, and the first user can seek a ride match at a stop location 36d along an alternative route as well. Incentive for the first user to travel to the stop location 36d along the alternative route might include a higher confidence for a ride match (i.e., larger ride match location) without significantly detouring or deviating from the most direct route. In the contemplated embodiment, a second user queries the system in search of a ride to a same or proximate destination 34 at a same or close arrival time.

In FIG. 3B, a second user (passenger) is located at origin node 32 and wants to travel to destination node 34 at a desired time. If this passenger desires to rideshare or carpool, because the distance between the origin and destination is far or the transportation means are too difficult, or for any different purpose, the second user can query the system in search of where rideshare or carpool drivers might pass. Using its passenger computing device, the passenger can query the system for estimates regarding driver demand and the location information where drivers are predicted to be available for or offering rides, based on the trajectory data. As part of the query, the second user also provides the system with a target time for reaching the destination 34 as input.

The system computes the output using the method disclosed in FIGS. 2A-2D and outputs coordinates where the second user can potentially find a ride match. The map illustrated in FIG. 3B shows three nodes (represented as shaded ovals) representing potential ride match locations 38. As illustrated in the FIG. 3B, the sizes of the identified ride match locations 38 are different. In one embodiment, the size can be proportional to the predicted number of drivers available for a ride match, where the fewest vehicles are estimated for the smallest ride match location 38a and the largest number of vehicles is estimated for the largest ride match location 38b. In this manner, the second user also has an option of going to the ride match location 38c that is closest to its origin 32. This embodiment contemplates that the second user does not know where the driver is coming from, or the traveler's route, so the second user would not select a location that is on the most direct route of the driver. Incentive for the second passenger to wait at a stop location 38a that is farther from the origin node 32 than a different location would be a higher confidence for a ride match (i.e., larger ride match location). In the contemplated embodiment, the first user queries the system in search of a carpooling or ride sharing passenger that could be in search of a ride to a same or proximate destination 34 at a same or close arrival time.

Figure 4:
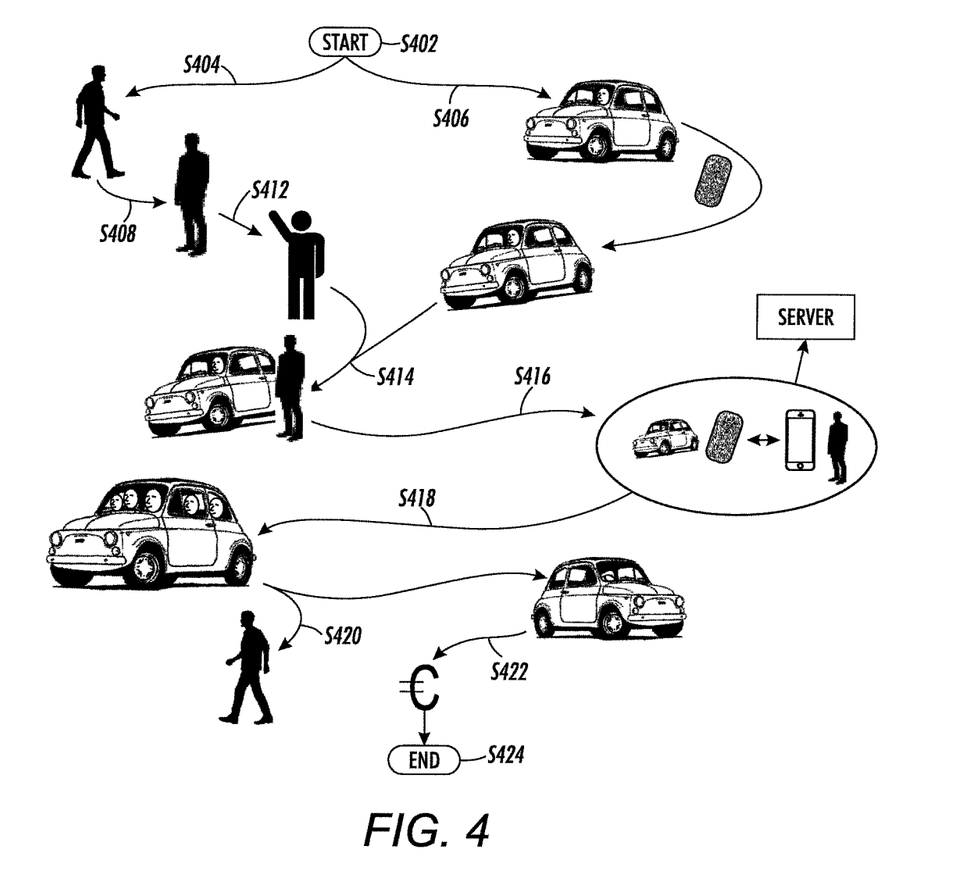
FIG. 4 depicts a transaction between a driver-user and a passenger-user.

FIG. 4 depicts a transaction between a driver and a passenger after these users were provided the ride match locations. The method starts at S402. The driver and the passenger head to a ride match location. For illustrative purposes, the scenario discussed in conjunction with FIG. 4 assumes that both users were provided the same ride match location. The passenger and the driver head toward the ride match location at SS 404-406. The passenger waits at the ride match location S408. The system contemplates that multiple users 40, 42 of the system are registered or known by the server computer (100 in FIG. 1). The driver 42 is contemplated to include a seamless badge 44 in its vehicle. The Seamless® badge 44 corresponds to the Seamless® technology, described in U.S. Patent Application 2014/0201066, filed Jan. 14, 2013, titled "SYSTEM AND METHOD FOR ENABLING TRANSACTIONS ON AN ASSOCIATED NETWORK," to Pascal Roux, et al., the contents of which are fully incorporated herein.

A user (i.e., passenger 40) registers itself and creates an account in a unique central system, then downloads an application to a mobile user device (e.g., 126 in FIG. 1), such as a mobile smartphone. The application is resident on a mobile device, such as a smart phone, that is capable of near field communications (NFC). Tags (or badges 44) are positioned on vehicles of the current system. Each tag 44 has a unique identifier associated with the driver, an irreversible counter, a master key, and a log of previous transactions.

The disclosure contemplates that there is a visible indicator on or in association with the vehicle that would inform the passenger that the driver of the vehicle is available for ridesharing using the present system. There is no limitation made herein regarding the type indicator. It can include one of a hang tag, a sticker, and a decal, etc. When the passenger detects the vehicle approaching at S410, it can hail the vehicle at S412. In another contemplated embodiment, a separate, personalized system can predict where each user goes. The system of each user can cooperate with systems of other users to generate alerts when a match is probable. Particularly, the system can compute a match is likely to occur using the prediction generated by the disclosed system estimating a ride match location based on a target time. Accordingly, the personalized system can use the information generated by the disclosed system to predict a ride match.

The driver can stop at S414 for the potential passenger and agree or decline to provide the carpool service. Should the users desire, each can consult the reputation information regarding the other user at this time. If the parties agree to rideshare or carpool, the mobile user device need only be placed in proximity to the tag to initiate a transaction at S416, during which mutual authentication occurs, and a log of the transaction is recorded on the tag. The log, or a portion of the log, may be communicated back to the central system (100 in FIG. 1) by the user device in conjunction with other transaction information corresponding to that particular user device. The user account is or will subsequently be charged for the service.

The service is then delivered. The users share the vehicle en route to the final destination at S418. The passenger departs the vehicle at the final destination at S420. In the event that the user device is unable to communicate the log to the central system for payment simultaneous with the transaction, the log assures that the central system will receive a record of that transaction between the tag and the user device. After the rideshare, each user may give feedback on the other user to the system. The server computer handles the payment transaction at S422, particularly charging an account associated with the passenger and transferring payment to the account associated with the driver. The method ends at S424.

By using the Seamless® technology, the system and method set forth herein is independent from both cellular telephone manufacturers and cellular phone network operators, based upon the use of the NFC standard. Additionally, the systems and methods are also independent of the SIM card capability and of mobile phone security services. The system and method further provides robust interoperability for the user between multiple service providers utilizing the same application, with the user only having to register once with the central system prior to the first transaction. Thus, the subject system and method provides low cost unconnected and optionally unpowered tags as infrastructure investment; intermittent, i.e., opportunistic, network connections of the user's device are tolerated by the system, and users can stay in disconnected mode for several service consumptions; and the system does not rely on the mobile SIM-card and is therefore independent from the mobile network operator.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 22, (for example, an internal hard drive of RAM), or may be separate (for example, an external hard drive operatively connected with the computer 20), or may be separate and accessed via a digital data network such as a local area network (LAN) or the Internet (for example, as a redundant array of inexpensive or independent disks (RAID) or other network server storage that is indirectly accessed by the computer 118, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2A-2D, can be used to implement the method. As will be appreciated, while the steps of the method may be computer implemented, in some embodiments one or more of the steps may be at least partially performed manually. As will also be appreciated, the steps of the method need not all proceed in the order illustrated and fewer, more, or different steps may be performed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for processing a carpooling transaction, the system comprising:
a non-transitory storage device having stored instructions thereon for:
transmitting a security certificate to a first network device and a key to a second network device, the certificate and the key for enabling a mutual authentication between the first and second network devices, wherein at least one of the network devices is a mobile phone and another of the network devices is a badge;
in response to receiving a query from at least one of the network devices for a ride match location to a given destination,
acquiring a dataset of logged trajectories and representing each trajectory that intersects with a set of nodes as a timed series of nodes;
identifying nodes along the trajectories within a region of interest using the haversine formula;
in response to the query being from the mobile device, building a first matrix to include each trajectory that intersects with the identified nodes and the given destination;
using the matrix, determining location coordinates for a select node where a user of the first network device can connect with a user of the second network device;
transmitting the location coordinates to at least one of the network devices; and
processing a transaction between the first and second network devices subsequent to a mutual authentication between the first network device and the second network; and
updating the trajectory between the select node and the destination node in the dataset;
at least one hardware processor being part of a computing device and configured to execute the instructions thereon; and
at least one of the first and second network devices for displaying the location coordinates.

2. The system of claim 1, wherein the badge associated is with a registered driver of the system.

3. The system of claim 1, wherein the processor is further operative to:
compute a similarity between trajectories to allocate relationships; and,
cluster nodes over all trajectories.

4. The system of claim 3, wherein the processor is further operative to:

map nodes to a closest node under a constraint that the distance cannot be more than a predetermined value.

5. The system of claim 1, wherein the matrix for determines the number of drivers that were previously observed at or passing the destination node before the target arrival time during the given time interval.

6. The system of claim 5, wherein the processor is further operative to:
from an acquired dataset, identify a set of trips where the at least one driver previously passed or ended at the destination node during the destination time interval;
identify the network nodes that intersected with a trajectory of the previous trips;
for each of the identified network nodes, determine a time the vehicle passed the network node;
in response to the time the driver passed the network node being before the destination time interval, increase a count of the matrix; and
in response to the count being greater or equal to one, associating the network node as being the location where the at least one driver is determined to be available at or offering rides to the given destination.

7. The system of claim 6, wherein the processor is further operative to:
normalize the count by a predefined period of observations for determining the number of drivers that will pass or end at the given destination during the time interval that includes the target time.

8. The system of claim 6 wherein the time interval is defined as every ten minutes during a one week period [1, 7×24×6].

9. The system of claim 1, wherein the two users include:
at least one registered passenger of the system associated with the mobile device, the passenger seeking a ride to the given destination; and
at least one registered driver or person associated with the badge and offering a ride service, the driver or person being associated with a vehicle that can provide the ride to the passenger, wherein each of the two users are associated with different network devices.

10. The system of claim 1, wherein the processor is further operative to:
in response to the query being from the badge, build a matrix to determine a number of passengers that were previously observed waiting at or passing a given node before a target arrival time during a given time interval.

11. The system of claim 10, wherein the processor is further operative to:
from the acquired dataset, identify a set of trips where a passenger received a ride that ended at the destination during the given time interval;
identify origin and stop nodes corresponding to each trip of the set of trips;
for each of the identified origin and stop node, determine a time of the passenger passing the origin or stop node;
increase a count in a cell of the matrix corresponding to the origin or stop node and the determined time; and
in response to the count being greater or equal to one, associating the origin or stop node as being the location where at least one potential passenger is predicted to be searching for a ride to the given destination.

12. The system of claim 11, wherein the processor is further operative to:
normalize the count by a predefined period of observations for predicting the number of passengers that will wait or end at the given node during the time interval that includes the target time.

13. The system of claim 10, wherein the time interval is defined as every ten minutes during a one week period [1, 7×24×6].

14. A system of claim 1, wherein the processor is further operative to:
build a second matrix to include count origin and stop nodes that were passed within a given time interval;
using the first matrix, determine a vehicle that will pass or end at the destination during the given time interval that includes a target arrival time for reaching the destination, wherein the vehicle is associated with the badge;
using the second matrix, determine a passenger that will pass or wait at a given node for reaching the given destination during the given time interval that includes the target time, wherein the passenger is associated with the mobile device;
based on the determinations, transmit the location coordinates to the mobile device of select node where at least one driver is offering a ride service to the given destination, wherein the transmitting is performed in response to the system receiving the query from the mobile device for a ride match to the destination at the target arrival time; and
transmitting coordinates to the badge of the select node where at least one passenger is searching for a ride to the given destination by the target arrival time, wherein the transmitting is performed in response to the system receiving the query from the badge for a ride match to the given destination at the target arrival time.

* * * * *